US012138230B2

(12) United States Patent
Wang

(10) Patent No.: US 12,138,230 B2
(45) Date of Patent: Nov. 12, 2024

(54) PILL CUTTER

(71) Applicant: E-LINK PLASTIC & METAL INDUSTRIAL CO., LTD., New Taipei (TW)

(72) Inventor: You Lin Wang, New Taipei (TW)

(73) Assignee: E-LINK PLASTIC & METAL INDUSTRIAL CO., LTD., New Taipei (TW)

( * ) Notice: Subject to any disclaimer, the term of this patent is extended or adjusted under 35 U.S.C. 154(b) by 322 days.

(21) Appl. No.: 17/726,564

(22) Filed: Apr. 22, 2022

(65) Prior Publication Data

US 2023/0338239 A1 Oct. 26, 2023

(51) Int. Cl.
*A61J 7/00* (2006.01)

(52) U.S. Cl.
CPC .................................. *A61J 7/0007* (2013.01)

(58) Field of Classification Search
CPC ........ A61J 7/0007; Y10S 241/27; B26D 5/10; B26D 3/30
See application file for complete search history.

(56) References Cited

U.S. PATENT DOCUMENTS 4,330,936 A * 5/1982 Swarth .................. A61J 7/0007 269/275
7,673,778 B2 * 3/2010 Sze .......................... B26D 7/22 225/104
9,827,165 B1 * 11/2017 Sundt .................... A61J 7/0007
2015/0257978 A1 * 9/2015 Smith ...................... B26D 7/01 225/103
2018/0333333 A1 * 11/2018 Lee .......................... B26D 7/22
2020/0060935 A1 * 2/2020 Alshear ................. A61J 7/0007
2021/0308013 A1 * 10/2021 Tian ...................... A61J 7/0007
2023/0024616 A1 * 1/2023 Dang .................... A61J 7/0007

FOREIGN PATENT DOCUMENTS

CN 111789764 A * 10/2020
DE 202005018139 U1 * 3/2006 ............ A61J 7/0007

* cited by examiner

*Primary Examiner* — Jennifer S Matthews
(74) *Attorney, Agent, or Firm* — WPAT, P.C

(57) ABSTRACT

A pill cutter is provided and has a base, two holders, a driving assembly, and a lid. The two holders are movably mounted on the base and configured to clamp one or multiple pills at the same time. The driving assembly is connected to the two holders and is capable of driving the two holders to move. The driving assembly comprises two wheels and the two wheels are connected to the two holders. The lid is tiltably mounted on the base, and a blade is mounted on the lid and configured to split the pill(s) at the same time. When the two wheels are rotated, the two holders are capable of moving toward each other or away from each other. With the holders driven by the wheels, multiple pills can be clamped by the holders and cut at once, which saves a lot of time.

18 Claims, 8 Drawing Sheets

PILL CUTTER

BACKGROUND OF THE INVENTION

1. Field of the Invention

The present invention relates to a medical device, especially to a pill cutter that is capable of clamping and cutting pills safely in any standardized size.

2. Description of the Prior Arts

Pills are manufactured in specific doses but different patients and different diseases need different dosages according to their respective prescriptions. For example, a dosage for a child may be half of a dosage for an adult. Therefore, the pill should be split into a suitable dose. Even though every pill has a notch formed thereon to facilitate splitting, a user still has difficulty cutting the pill along the notch because the pill is solid and hard. Thus, the pill may not be split into suitable doses. However, some of the pills are formed into a round shape with curved surfaces such that the patient cannot hold the pill stably on a cutting board with fingers and might be injured when cutting a round pill directly with a knife.

Pill cutters are invented for this purpose. Conventionally, the pill cutter comprises a base, a lid, and a blade. The base forms a recess configured to receive a pill. The blade is mounted on the lid. After a pill is put in the recess of the base, the pill will be cut into two pieces by the blade upon closing of the lid on the base. To stably fix various pills, the recess of the base may be tapered. However, such structure only allows cutting one pill at a time, and if user needs to cut lots of pills, the same act has to be repeated too many times.

To overcome the shortcomings, the present invention provides a pill cutter to mitigate or obviate the aforementioned problems.

SUMMARY OF THE INVENTION

The main objective of the present invention is to provide a pill cutter that can spilt multiple pills at once.

The pill cutter has a base, two holders, a driving assembly, a lid, and a blade. The base comprises a bearing surface configured to bear at least one pill at the same time. The two holders are movably mounted on the bearing surface and configured to clamp the at least one pill at the same time. The driving assembly is connected to the two holders and is capable of driving the two holders to move. The driving assembly comprises two wheels. The two wheels are capable of rotating synchronously and each one of the two wheels is connected to the two holders. The lid is tiltably mounted on the base. The blade is mounted on the lid and configured to split the at least one pill at the same time. When the two wheels are rotated, the two holders are capable of moving toward each other or away from each other.

With the holders are driven by the wheels, multiple pills can be clamped by the holders and cut at once, which saves a lot of time.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
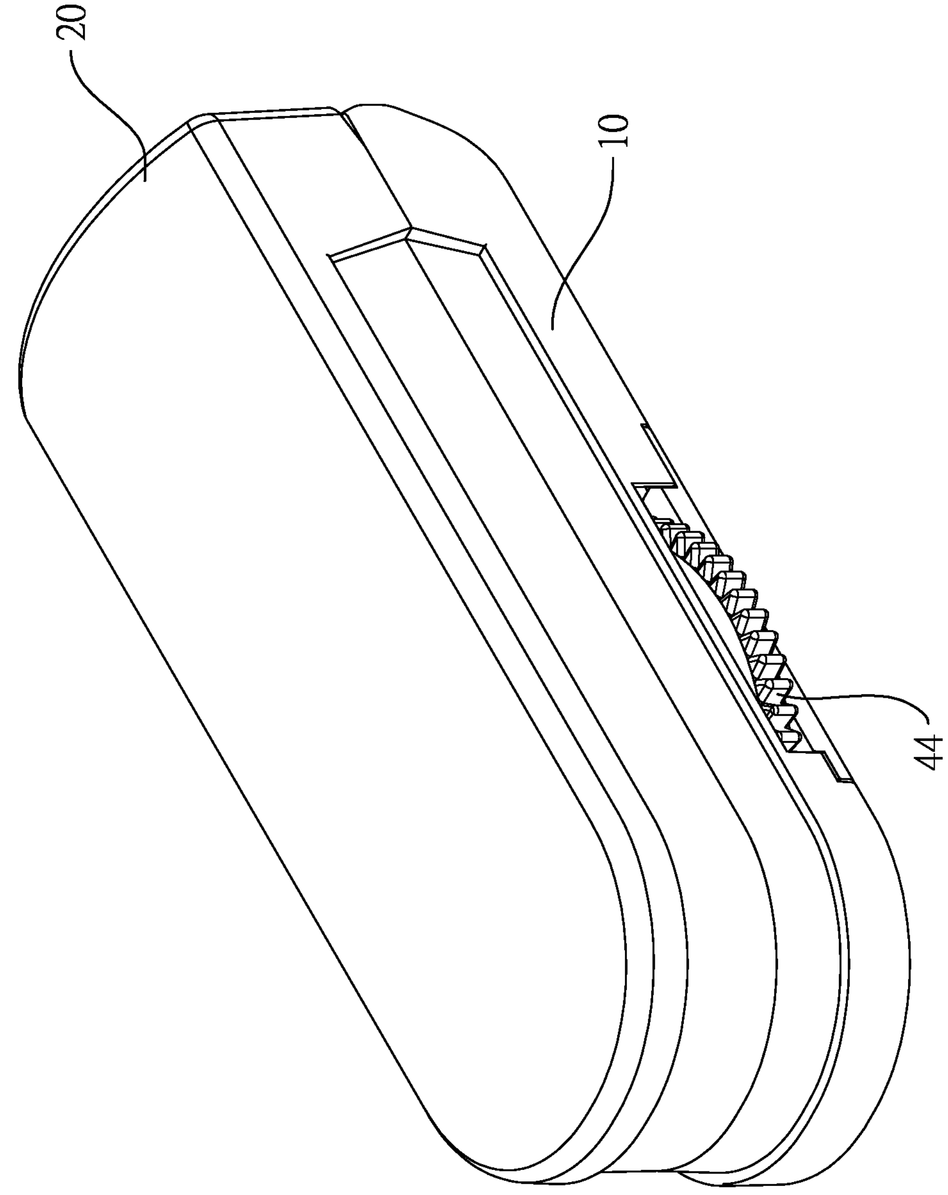
FIG. 1 is a perspective view of a pill cutter in accordance with the present invention.
Figure 2:
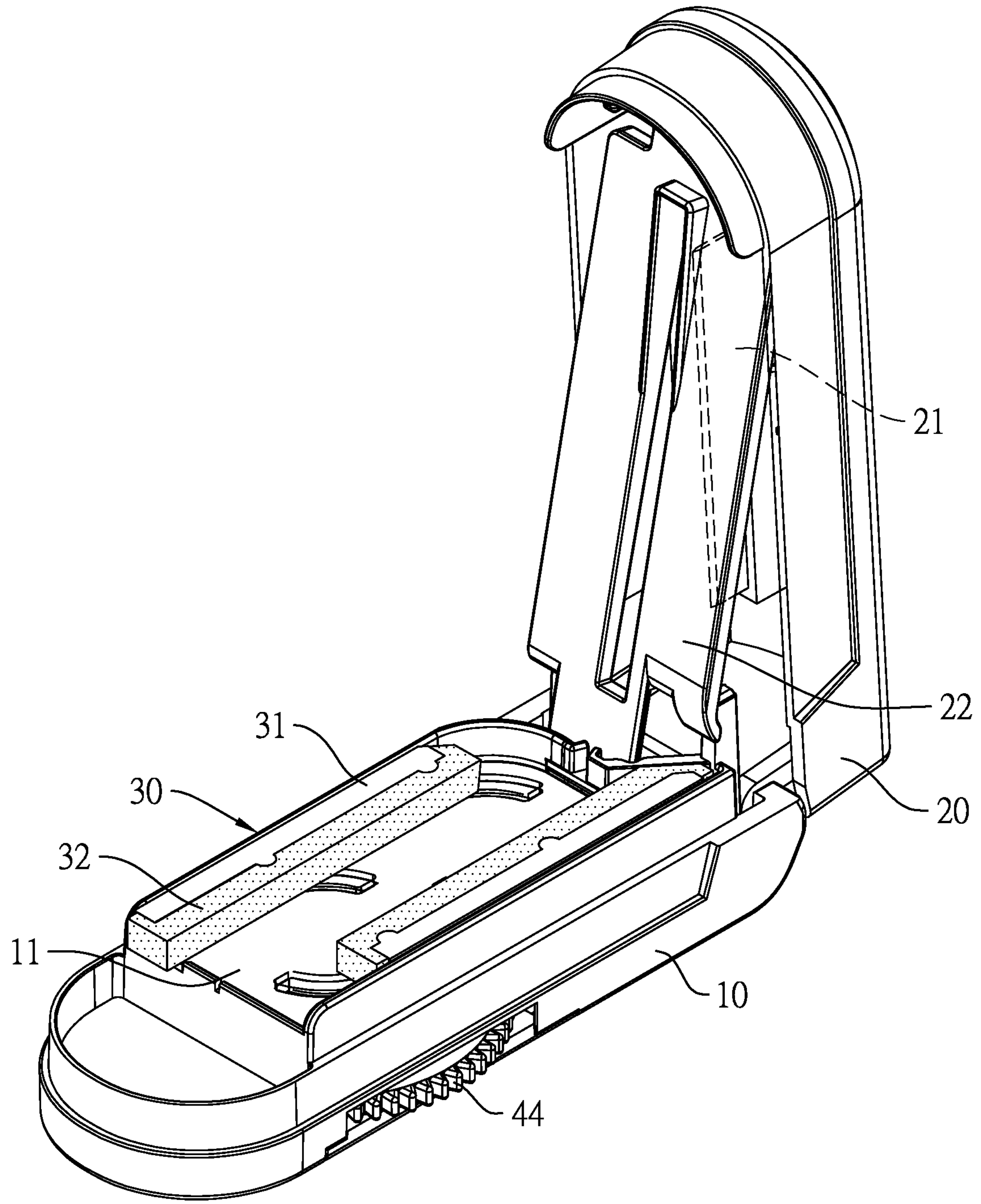
FIG. 2 is a perspective view of the pill cutter in FIG. 1 showing the lid is opened.
Figure 3:
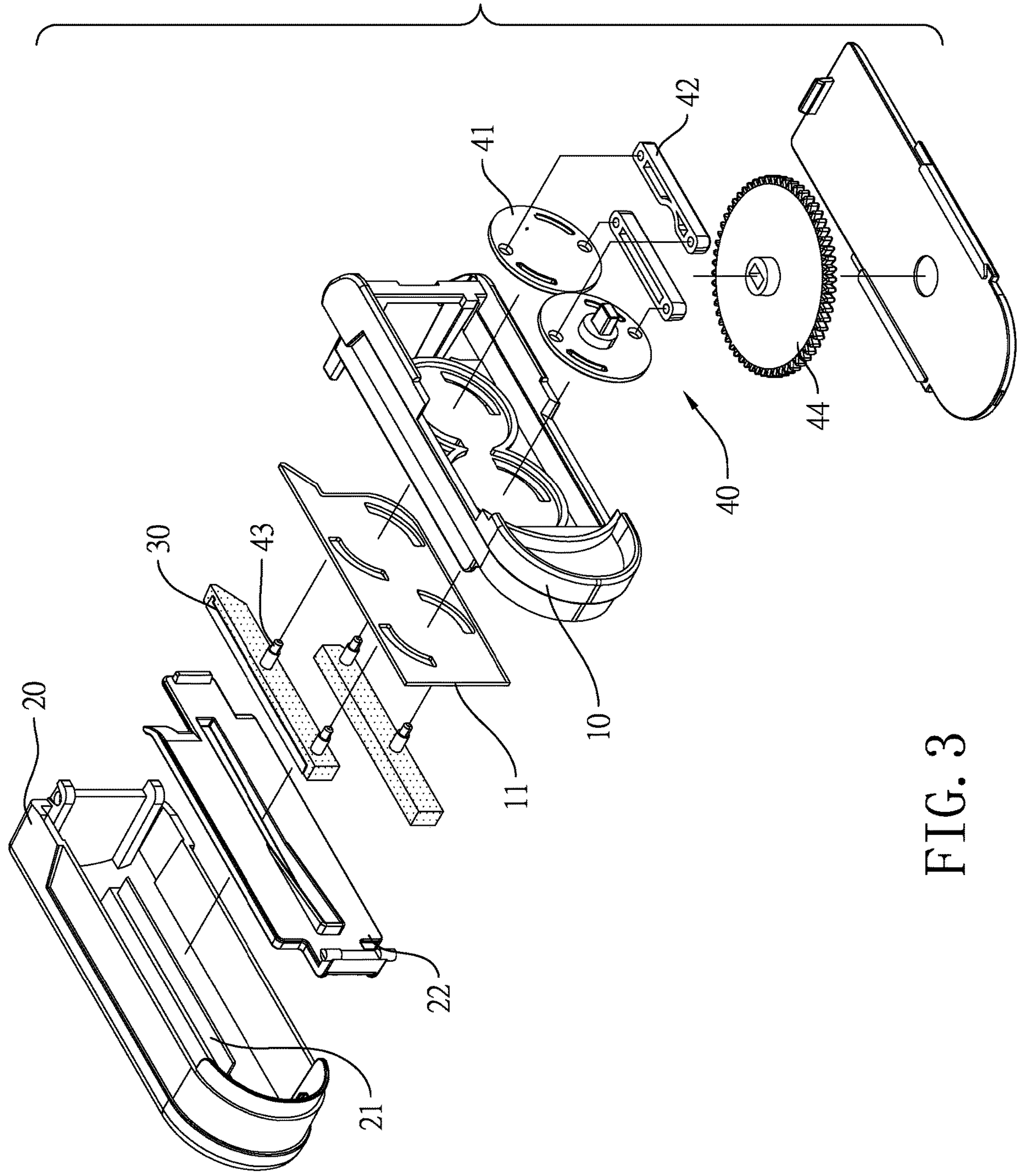
FIG. 3 is an exploded view of the pill cutter in FIG. 1.
Figure 4:
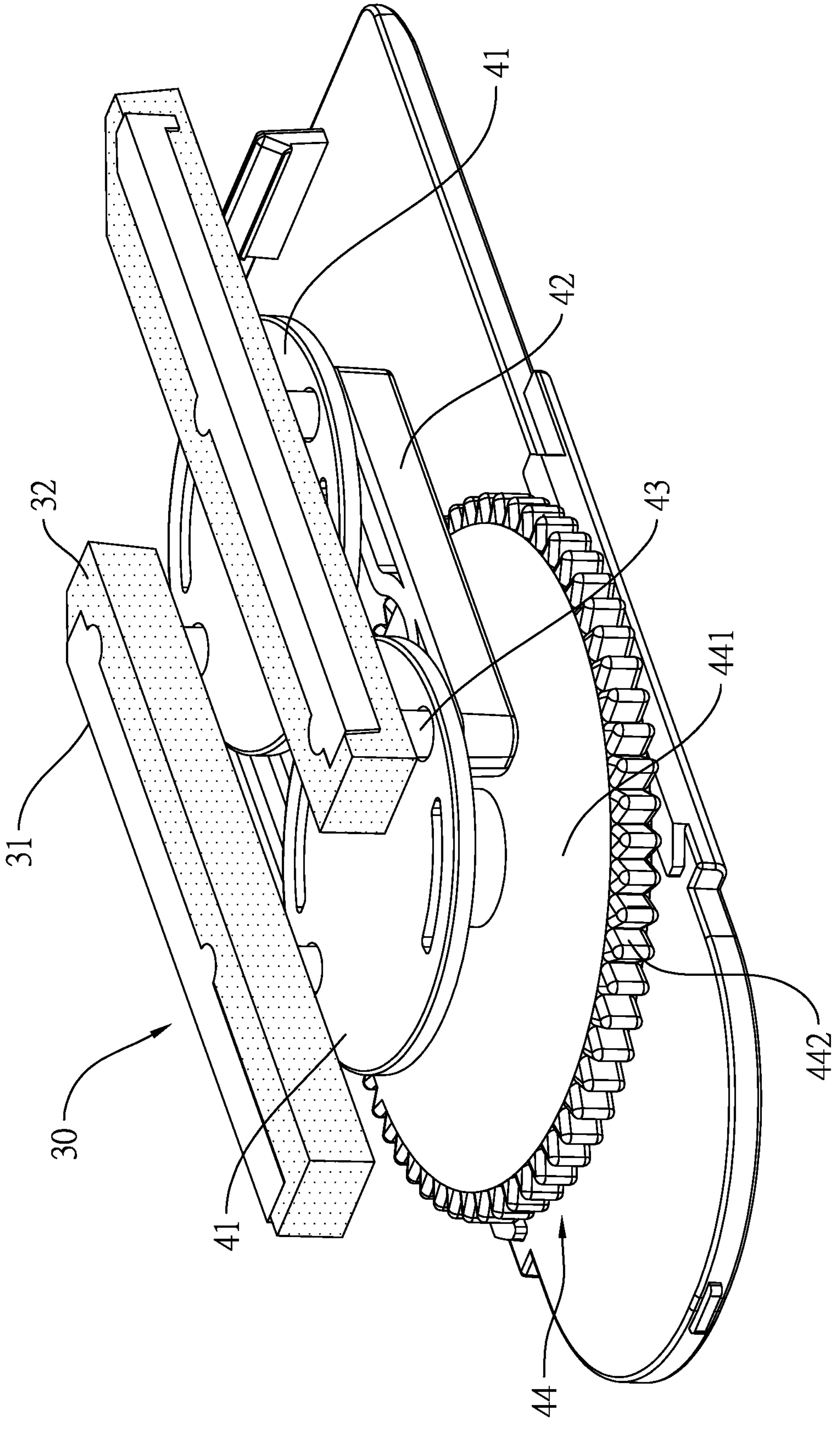
FIG. 4 is a perspective view of the driving assembly and the holders of the pill cutter in FIG. 1.
Figure 5:
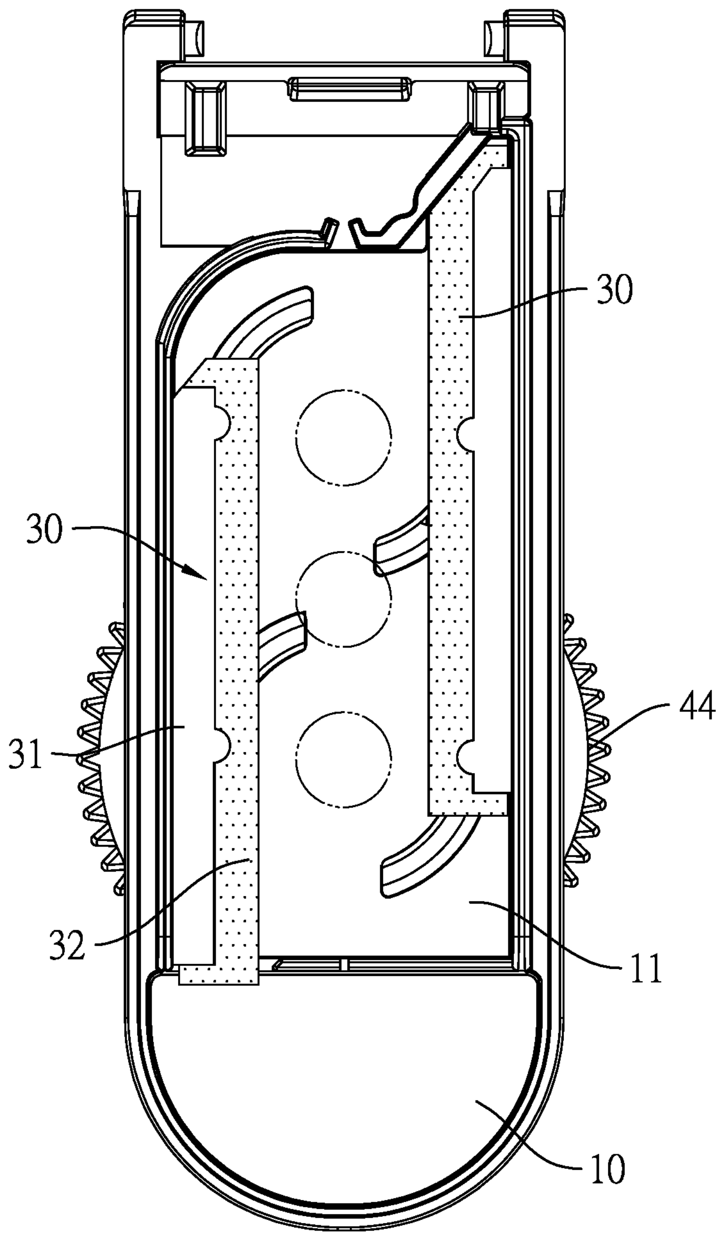
FIGS. 5 and 6 are serial operational views of the pill cutter in FIG. 1, showing pills clamped by the holder.
Figure 6:
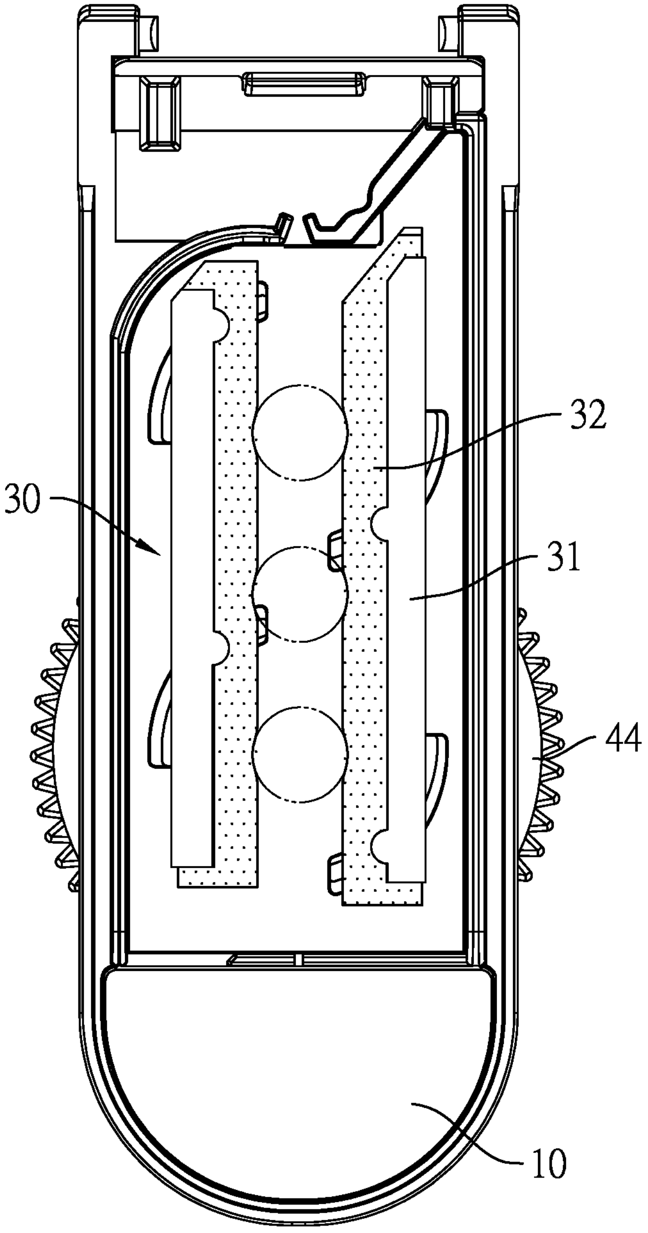
Figure 7:
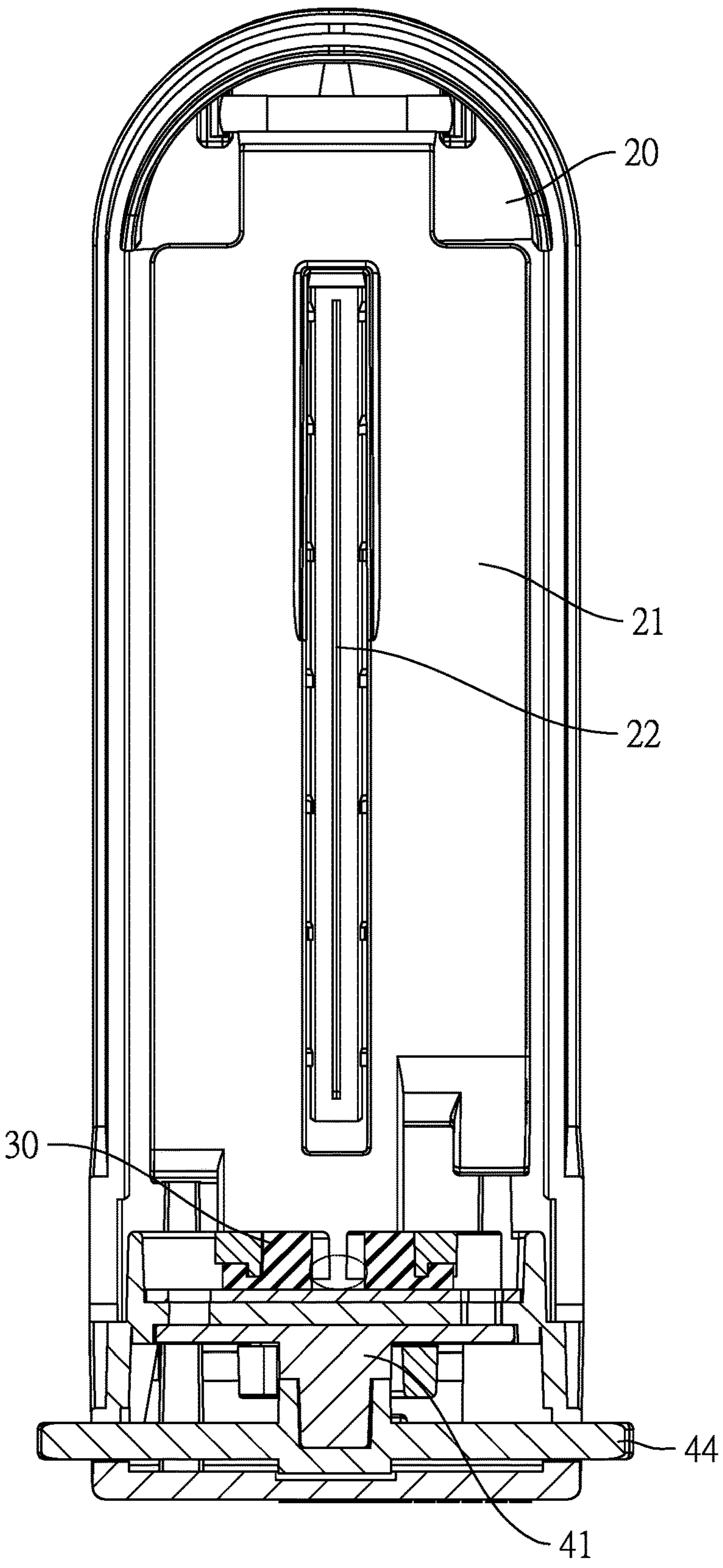
FIGS. 7 and 8 are sectional, serial, and operational views of the pill cutter in FIG. 1, showing pills clamped by the holder.
Figure 8:
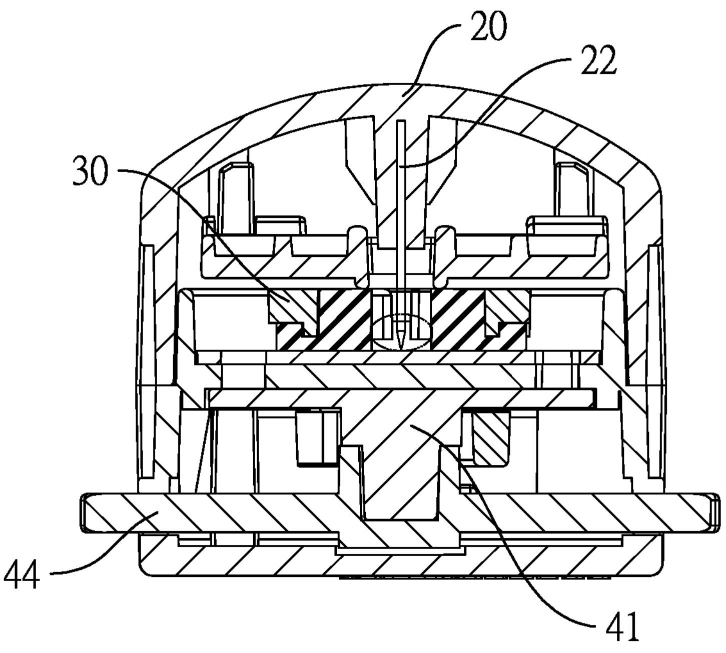

Referring to FIG. 1 to FIG. 3, a pill cutter provided in accordance with the present invention comprises a base 10, a cushion pad 11, a lid 20, a blade 21, a protecting board 22, two holders 30, and a driving assembly 40. Besides, in another embodiment, the pill cutter may not have the cushion pad 11 or may not have the protecting board 22. The pill cutter is configured to split at least one pill at the same time and, preferably, multiple pills at once.

The base 10 has a bearing surface. The bearing surface is configured to bear the pill(s). In this embodiment, the cushion pad 11 is mounted on the bearing surface. Therefore, the bearing surface bears the pill(s) via the cushion pad 11. The friction between the cushion pad 11 and the pill(s) may prevent the pill(s) from being moved easily.

The lid 20 is tiltably mounted on the base 10 and the blade 21 is mounted on the lid 20. Therefore, when the lid 20 is closed on the base 10, the blade 21 is capable of splitting the pills at the same time. The protecting board 22 has a first end and a second end. The first end is tiltably mounted on the base 10 and the second end is connected to the lid 20. When the lid 20 is opened, the blade 21 is located between the lid 20 and the protecting board 22 such that the blade 21 is covered by the protecting board 22. When the lid 20 is closed, the blade 21 penetrates through the protecting board 22 and splits the pill(s).

The two holders 30 are movably mounted on the bearing surface and configured to clamp the multiple pills at the same time. When the lid 20 is closed, the blade 21 penetrates through the protecting board 22 and is located between the two holders 30, such that the pills are split. In this embodiment, each one of the holders 30 is an elongate bar and the two holders 30 are kept in parallel with each other. The amount of the pills that can be clamped each time is determined by the length of the holders 30.

Each one of the holders 30 has a rigid portion 31 and a soft portion 32. The rigid portion 31 is connected to the driving assembly 40. The soft portion 32 is mounted on the rigid portion 31 and is closer to the other holder 30 than the rigid portion 31. The soft portion 32 is configured to contact the pill(s) at the same time. With the soft portions 32, the holders 30 can clamp the pill(s) tightly, and the pill(s) cannot move during clamping. Further, with the soft portions 32, even though for various pills of different shapes or dimensions, the holders 30 are still capable of clamping the pills.

The driving assembly 40 is connected to the two holders 30 and is capable of driving the two holders 30 to move. In this embodiment, the bearing surface is located between the wheels 41 and the holders 30, but it is not limited thereto. The driving assembly 40 comprises two wheels 41, two connecting bars 42, four sticks 43, and a controlling component 44.

The two wheels 41 are capable of rotating synchronously. In this embodiment, the wheels 41 rotate synchronously because of the two connecting bars 42. Precisely, two ends of each connecting bar 42 are respectively connected to the two wheels 41. However, in another embodiment, only one connecting bar 42 is still capable of achieving the same function. Each holder 30 is connected to the synchronous two wheels 41, so even when the wheels 41 are rotated, an angle between the two holders 30 is constant, i.e., the two holders 30 are kept in parallel.

In this embodiment, the holder 30 is connected to the wheels 41 via the rigid portion 31.

In this embodiment, each one of the sticks 43 connects one of the wheels 41, one of the holders 30, and one of the connecting bars 42. Precisely, each two of the sticks 43 is connected to one of the holders 30 such that each one of the holders 30 is respectively connected to the two wheels 41 by said two of the sticks 43.

In another embodiment, the driving assembly 40 may have more sticks 43. The holders 30 and the wheels 41 are connected by a part of the sticks 43, and the connecting bar 42(*s*) and the wheels 41 are connected by other sticks 43.

The sticks 43 are mounted on the rigid portions 31 of the holders 30. Besides, an imaginary line extends along two of the sticks 43 that are connected to the same one of the holders 30 and is parallel with another imaginary line extending along the remaining two of the sticks 43 that are connected to the other one of the holders 30. In this embodiment, each holder is an elongated body, so the imaginary line of the corresponding two sticks 43 is parallel with the longitudinal direction of said holder 30.

The controlling component 44 is connected to one of the wheels 41 and configured to drive said wheel 41 to rotate. The controlling component 44 is mounted in the base 10 but extends out of the base 10 so that user can touch and rotate the controlling component 44. When the controlling component 44 is rotated, the wheel 41 connected to the controlling component 44 is rotated along with the controlling component 44.

In this embodiment, the controlling component 44 extends out of the base 10 from both two sides of the base 10, which is more convenient to use. Moreover, the controlling component 44 comprises a disc 441 and a plurality of teeth 442. The disc 441 is rotatably mounted on the base 10 and connected to said one of the wheels 41. A diameter is larger than a width of the base 10 such that the disc 441 extends out of the base 10 from both two sides of the base 10. In this embodiment, a center of the disc 441 is mounted at a center of one of the wheels 41. The teeth 442 are mounted on a perimeter of the disc 441.

With the aforementioned structures, when the user wants to cut multiple pills at one time, the user can rotate the controlling component 44 to rotate the wheels 41 and make the two holders 30 move away from each other. After the pills are put on the bearing surface and between the two holders 30, the user can rotate the controlling component 44 in opposite directions so that the two holders 30 move toward and close to each other and clamp the pills. Then, the lid 20 is closed on the base 10 and the blade 21 can cut the pills.

In another embodiment, the driving assembly 40 may not have the controlling component 44 and the user can rotate the wheel 41 directly to clamp the pills.

Consequently, with the holders 30 driven by the wheels 41, multiple pills can be clamped by the holder 30 and cut at once, which saves a lot of time.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pill cutter comprising:
a base comprising:
a bearing surface configured to bear at least one pill;
two holders movably mounted on the bearing surface and configured to clamp the at least one pill;
a driving assembly connected to and driving the two holders to move;
the driving assembly comprising:
two wheels rotating synchronously, each one of the two wheels connected to the two holders; and
a controlling component connected to one of the wheels and configured to drive said wheel to rotate;
a lid tiltably mounted on the base; and a blade mounted on the lid and configured to split the at least one pill;
wherein when the two wheels are rotated, the two holders move toward each other or away from each other.

2. The pill cutter as claimed in claim 1, wherein the bearing surface is located between the wheels and the holders.

3. The pill cutter as claimed in claim 2, wherein:
the two holders are a first holder and a second holder;
the driving assembly comprises:
a first stick, a second stick, a third stick, and a fourth stick, each one of the sticks connected to one of the two wheels and one of the holders; the first stick and the second stick connected to the first holder and one of the two wheels and the third stick and the fourth stick connected to the second holder and the other of the two wheels.

4. The pill cutter as claimed in claim 3, wherein:
an imaginary line extending along the first stick and the second stick is parallel with an imaginary line extending along the third stick and the fourth stick.

5. The pill cutter as claimed in claim 4, wherein the driving assembly comprises: a connecting bar connected to the two wheels such that the two wheels rotate synchronously.

6. The pill cutter as claimed in claim 5, wherein the first stick and the second stick are connected to the connecting bar.

7. The pill cutter as claimed in claim 6, wherein the controlling component comprises:
a disc rotatably mounted on the base and connected to said one of the wheels; and
a plurality of teeth mounted on a perimeter of the disc.

8. The pill cutter as claimed in claim 7, wherein each one of the holders comprises: a rigid portion connected to the two of the sticks; and a soft portion mounted on the rigid portion and closer to the other holder than the rigid portion; the soft portion configured to contact the at least one pill.

9. The pill cutter as claimed in claim 8 further comprising:
a cushion pad mounted on the bearing surface of the base; the bearing surface bearing the at least one pill via the cushion pad.

10. The pill cutter as claimed in claim 9 further comprising:
a protecting board comprising:
a first end tiltably mounted on the base; and
a second end connected to the lid;

wherein when the lid is opened, the blade is covered by the protecting board; when the lid is closed, the blade penetrates through the protecting board and is located between the two holders.

11. The pill cutter as claimed in claim 1, wherein:

the two holders are a first holder and a second holder;

the driving assembly comprises:

a first stick, a second stick, a third stick, and a fourth stick, each one of the sticks connected to one of the two wheels and one of the holders; the first stick and the second stick connected to the first holder and one of the two wheels and the third stick and the fourth stick connected to the second holder and the other of the two wheels.

12. The pill cutter as claimed in claim 11, wherein:

an imaginary line extending along the first stick and the second stick is parallel with an imaginary line extending along the third stick and the fourth stick.

13. The pill cutter as claimed in claim 1, wherein the driving assembly comprises: a connecting bar connected to the two wheels such that the two wheels rotate synchronously.

14. The pill cutter as claimed in claim 13, wherein:

the two holders are a first holder and a second holder;

the driving assembly comprises:

a first stick, a second stick, a third stick, and a fourth stick, each one of the sticks connected to one of the two wheels and one of the holders; the first stick and the second stick connected to the first holder and one of the two wheels and the third stick and the fourth stick connected to the second holder and the other of the two wheels, and the first stick and the second stick further connected to the connecting bar.

15. The pill cutter as claimed in claim 1, wherein the controlling component comprises:

a disc rotatably mounted on the base and connected to said one of the wheels; and a plurality of teeth mounted on a perimeter of the disc.

16. The pill cutter as claimed in claim 1, wherein each one of the holders comprises: a rigid portion connected to the driving assembly; and a soft portion mounted on the rigid portion and closer to the other holder than the rigid portion; the soft portion configured to contact the at least one pill.

17. The pill cutter as claimed in claim 1 further comprising:

a cushion pad mounted on the bearing surface of the base; the bearing surface bearing the at least one pill via the cushion pad.

18. The pill cutter as claimed in claim 1 further comprising:

a protecting board comprising:

a first end tiltably mounted on the base; and a second end connected to the lid;

wherein when the lid is opened, the blade is covered by the protecting board; when the lid is closed, the blade penetrates through the protecting board and is located between the two holders.

* * * * *